UNITED STATES PATENT OFFICE.

LOUIS HENRY FRIEDBURG, OF NEW YORK, N. Y., ASSIGNOR TO GENERAL ELECTRIC COMPANY, A CORPORATION OF NEW YORK.

PLASTIC CONDENSATION PRODUCT.

1,119,592.

Specification of Letters Patent. Patented Dec. 1, 1914.

No Drawing. Application filed September 12, 1912. Serial No. 719,982.

*To all whom it may concern:*

Be it known that I, LOUIS HENRY FRIEDBURG, a citizen of the United States, residing at New York, county of New York, State of New York, have invented certain new and useful Improvements in Plastic Condensation Products, of which the following is a specification.

The present invention comprises a new plastic composition and the process of making the same. Its object is to provide a synthetic resin, suitable for electrical insulation, molded articles, and the like, which possesses flexibility and which may be rendered insoluble and infusible, without loss of flexibility.

Glycerol and other polyhydric alcohols, and polybasic acids or anhydrids, such as phthalic anhydrid, combine at an elevated temperature to form fusible and soluble resins. Upon further heating, they become infusible and insoluble. These resins in both their intermediate and final state although strong and hard are usually quite brittle.

In accordance with my present invention, these resins are rendered flexible both in the intermediate fusible, and final infusible, state by combination with butyric acid, a monobasic acid of the aliphatic series.

A typical resin is prepared by heating two parts by weight of phthalic anhydrid, $C_6H_4(CO)_2O$, with one part of glycerol, $C_3H_5(OH)_3$, in a suitable container to a temperature of about 100° C., the temperature being slowly increased to about 185° C. The mixture is maintained at this temperature until distillation of water, acrolein and other vapors ceases. The temperatures may be allowed finally to rise as high as 210° C. When a sample taken from the mass upon cooling is hard and brittle without stickiness, the first part of the reaction has been completed. The product is a colorless or yellowish resin, fusible, and soluble in acetone.

About 22 parts of the resulting resinous product are dissolved, with about 10 parts of butyric acid, $C_3H_7CO_2H$, in glycerol and heated, using a reflux condenser, for a period varying with the amounts and other conditions from 8 to 24 hours. The product is then heated under conditions permitting the removal of vapors, in an open vessel, at a temperature of about 300° C. until distillation ceases and when samples taken from the mass show the proper consistency. The product is a very soft, rubber-like brownish mass, also soluble in acetone. For impregnating fibrous or cellular matter, such as electrical coils wound with fabric, or wood, cloth, paper and the like, the acetone solution may be used and the solvent subsequently evaporated.

The fusible, soluble resin may be rendered infusible, and apparently insoluble, without destroying its flexibility by heating for about 2 to 3 hours to about 100–120° C. In my opinion the butyric acid combines with unattacked hydroxyl forming an ester having the formula,

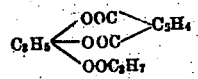

The resin is saponifiable with alkali to yield the polyhydric alcohol used, for example, glycerin and a compound of the alkali with the respective acids used.

Either normal butyric acid or isobutyric acid may be used in carrying out the described process.

A mixture of 88 parts of phthalic-glycerol resin and 36 parts of isobutyric acid may be heated with the aid of a reflux condenser for about eight hours at its boiling point. The heating is then continued under conditions permitting distillation, as already described in connection with the normal acid. The resulting clear, brownish flexible resin may be converted to an insoluble, infusible stage by further heating without loss of flexibility.

The process may also be carried out by starting with a mixture of 75 parts of phthalic anhydrid, 40 parts of glycerin and 40 parts of isobutyric acid. This mixture is treated in the same manner as above described to produce a flexible resin.

In some cases glycerol phthalic anhydrid and butyric acid may be mixed in the first instance and caused to react simultaneously. For example, 75 parts of phthalic anhydrid, 40 parts of glycerol and 45 parts of butyric acid are heated, first with the aid of a reflux condenser and finally so as to permit distillation as above described. A dark ruby red, flexible resin is obtained.

What I claim as new, and desire to se cure by Letters Patent of the United States, is:—

1. The process which consists in heating a mixture containing a polyhydric alcohol, phthalic anhydrid and butyric acid for a protracted period under conditions unfavorable to distillation and then distilling off uncombined ingredients and leaving a plastic, resinous product.

2. The process which consists in dissolving a reaction product of glycerol and phthalic anhydrid in glycerol adding butyric acid and heating to effect combination and finally distilling uncombined ingredients leaving a flexible, resinous material.

3. As a composition of matter, an insoluble, infusible, flexible resinous material comprising a mixed ester of a polyhydric alcohol, phthalic anhydrid and butyric acid.

4. As a composition of matter, a flexible resinous material comprising a condensation product saponifiable with an alkali to yield glycerol, and compounds of phthalic and butyric acids.

5. As a composition of matter, a flexible condensation product saponifiable with an alkali to form glycerol and compounds of the alkali with both phthalic acid and a monobasic aliphatic acid.

6. As a composition of matter, a flexible resinous condensation product saponifiable with alkali to form a polyhydric alcohol and a phthalate and a compound of a monobasic, aliphatic acid.

7. As a composition of matter, a flexible condensation product saponifiable to yield a polyhydric alcohol and compound of a polybasic acid and butyric acid.

In witness whereof, I have hereunto set my hand this tenth day of September, 1912.

LOUIS HENRY FRIEDBURG.

Witnesses:
JOHN C. PENNIE,
M. A. BILL.